(12) United States Patent
Lin

(10) Patent No.: US 6,808,182 B2
(45) Date of Patent: Oct. 26, 2004

(54) QUICK RELEASE OR CONNECT CHUCK DEVICE

(75) Inventor: Ying-Mo Lin, Chang Hua Hsien (TW)

(73) Assignee: Zangzhou I Con Machinery Co., Ltd., Chang Chou (CN)

( * ) Notice: Subject to any disclaimer, the term of this patent is extended or adjusted under 35 U.S.C. 154(b) by 145 days.

(21) Appl. No.: 10/331,441

(22) Filed: Dec. 27, 2002

(65) Prior Publication Data

US 2004/0124593 A1 Jul. 1, 2004

(51) Int. Cl.$^7$ .............................................. B23B 31/16
(52) U.S. Cl. ............................. 279/74; 279/14; 279/29; 279/82; 7/165; 81/436
(58) Field of Search ............................. 279/14, 22, 29, 279/30, 74, 75, 82, 143, 145, 906; 30/337, 339; 7/158, 165, 167; 81/436

(56) References Cited

U.S. PATENT DOCUMENTS 5,573,255 A * 11/1996 Salpaka ...................... 279/75
5,903,983 A * 5/1999 Jungmann et al. ............ 30/392
6,260,281 B1 * 7/2001 Okumura et al. ............. 30/392
6,755,423 B2 * 6/2004 Chiu ........................... 279/30

* cited by examiner

Primary Examiner—Daniel W. Howell
Assistant Examiner—Luke Parsons
(74) Attorney, Agent, or Firm—Charles E. Baxley

(57) ABSTRACT

A chuck device includes a body having a slot in a first end thereof and a hole is defined radially in the body and communicates with the slot. A spring is mounted to the body and is biased between a stepped shoulder on the body and a movable clamp connected to the body. A connection rod is connected to a second end of the body. A positioning pin is movably inserted in the hole and an end of the positioning pin extends from the hole and has a tapered periphery. A sleeve is slidably mounted to the body and has a first tapered inner periphery for being matched with the tapered periphery of the positioning pin. A second tapered inner periphery is defined in a second end of the sleeve so as to push the movable clamp when sliding the sleeve by compressing the spring.

4 Claims, 8 Drawing Sheets

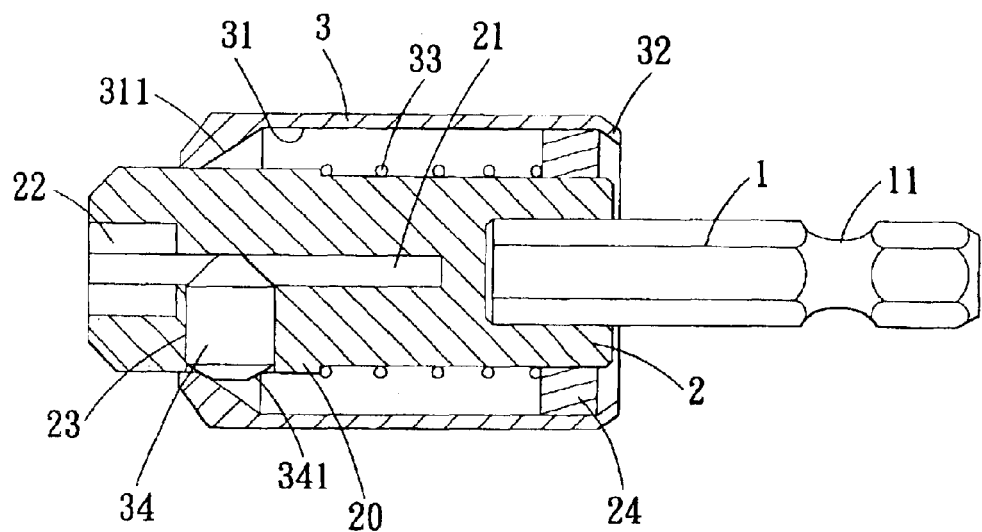
F I G. 1
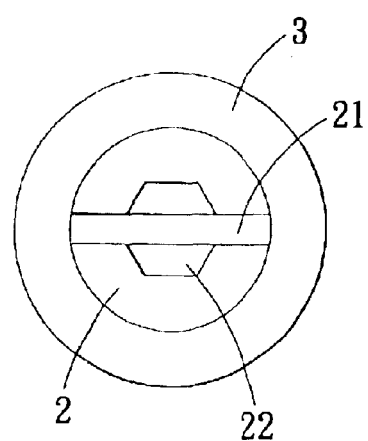
F I G. 2

QUICK RELEASE OR CONNECT CHUCK DEVICE

FIELD OF THE INVENTION

The present invention relates to a tool bit quick release or connect chuck device that has a sleeve to be slidably control a positioning pin to allow the tool bit to be quickly released from or connected to the chuck device.

BACKGROUND OF THE INVENTION

A conventional tool bit chuck device 6 for connecting a saw blade is shown in FIG. 9 and generally includes a hexagonal connection rod 64 extending from a first end of the body of the device 6 and an engaging port extends from a second end of the body of the device 6. A groove 641 is defined in an outer periphery of the connection rod 64 so as to be connected with a handle or the like. A slot 61 is defined through the engaging port and a threaded hole 62 defined laterally through the engaging port and communicates with the slot 61. The saw blade can be inserted in the slot 61 and a bolt 63 is engaged with the threaded hole 62 and contacts a side of the saw blade to position it. It takes time to screw the bolt 63 when installing the saw blade, and to unscrew the bolt 63 when removing the saw blade from the chuck device 6.

The present invention intends to provide a chuck device that is able to install or release a tool bit by simply sliding a sleeve on the device.

SUMMARY OF THE INVENTION

In accordance with one aspect of the present invention, there is provided a chuck device which comprises a body having a slot defined from a first end of the body and being ended before a second end of the body. A hexagonal recess is defined in the first end of the body and communicates with the slot. A hole is defined radially in the body and communicates with the slot. A stepped shoulder extends from an outer periphery of the body and a spring is mounted to the body and a first end of the spring is stopped by the stepped shoulder. A movable clamp is connected to the body and a second end of the spring contacts the movable clamp. A connection rod is connected to a second end of the body.

A sleeve is slidably mounted to the body and has a first tapered inner periphery at a first end of the sleeve. A second tapered inner periphery is defined in a second end of the sleeve so as to push the movable clamp when sliding the sleeve by compressing the spring.

A positioning pin is movably inserted in the hole and an end of the positioning pin extends from the hole and has a tapered periphery which is matched with the first tapered inner periphery at the first end of the sleeve.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1 is a cross sectional view to show the chuck device of the present invention;

FIG. 2 is an end view to show the first end of the body of the chuck device of the present invention;

DETAILED DESCRIPTION OF THE PREFERRED EMBODIMENT

Figure 3:
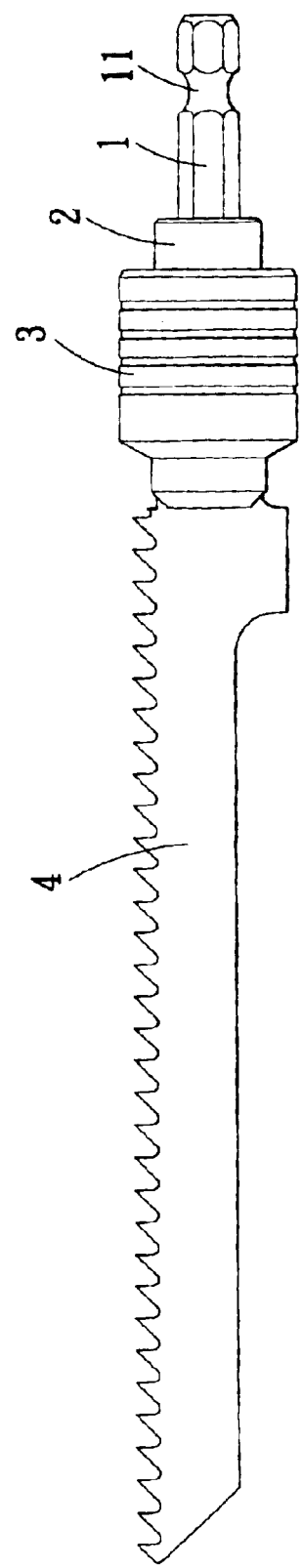
FIG. 3 shows a saw blade is connected to the chuck device of the present invention.

Referring to FIGS. 1 and 2, the chuck device of the present invention comprises a body 2 having a slot 21 defined from a first end of the body 2 and is ended before a second end of the body 2. A hexagonal recess 22 is defined in the first end of the body 2 and communicates with the slot 21. A hole 23 is defined radially in the body 2 and communicates with the slot 21. A stepped shoulder 20 extends from an outer periphery of the body 2 and a movable clamp 24 is connected to the body 2. A spring 33 is mounted to the body 2 and a first end of the spring 33 is stopped by the stepped shoulder 20 and a second end of the spring 33 contacts the movable clamp 24. A connection rod 1 is connected to a second end of the body 2 and includes a groove 11 defined in an outer periphery thereof.

A positioning pin 34 is movably inserted in the hole 23 and an end of the positioning pin 34 extends from the hole 23 and has a tapered periphery 341 which is accessed from outside of the body 2.

A sleeve 3 is slidably mounted to the body 2 and has a first tapered inner periphery 311 at a first end of the sleeve 3. The first tapered inner periphery 311 at the first end of the sleeve 3 is matched with the tapered periphery 341 of the positioning pin 34. A second tapered inner periphery 32 is defined in a second end of the sleeve 3 so as to push the movable clamp 24 when sliding the sleeve 3 by compressing the spring 33.

Figure 4:
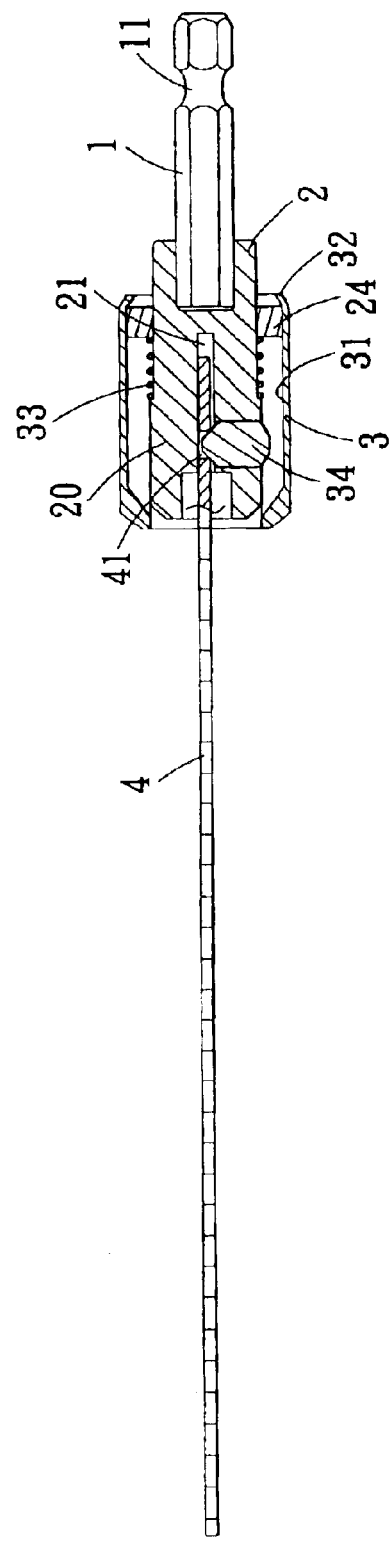
FIG. 4 shows the saw blade is positioned by the positioning pin in the chuck device of the present invention.

Referring to FIGS. 3 and 4, a saw blade 4 has an end inserted into the slot 21 and an aperture 41 is defined through the end of the blade 4. The positioning pin 34 drops out from the slot 21 due to the gravity by sliding the sleeve 3 toward the left in FIG. 1. After the end of the saw blade 4 is inserted, the sleeve 3 is released and the spring 33 pushes the sleeve 3 back and the positioning pin 34 is pushed back by the first tapered inner periphery 311 of the sleeve 3 and inserted in the aperture 41.

Figure 5:
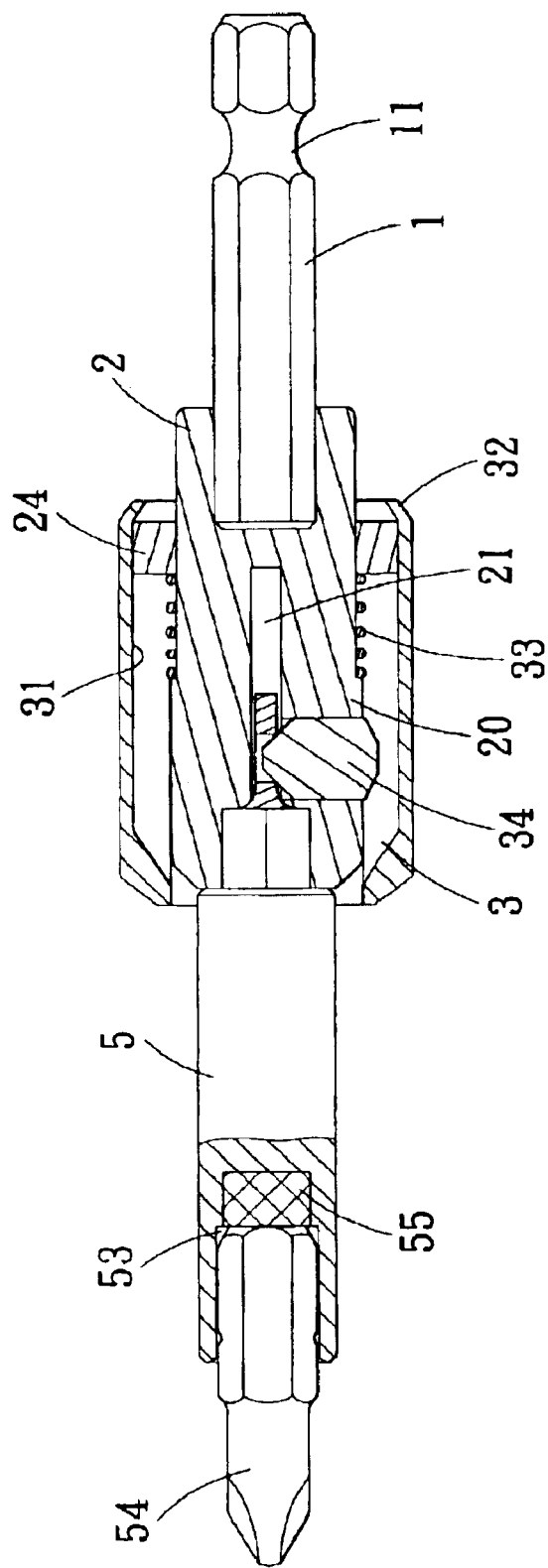
FIG. 5 shows a connection member is connected to a first end of the chuck device of the present invention.
Figure 6:
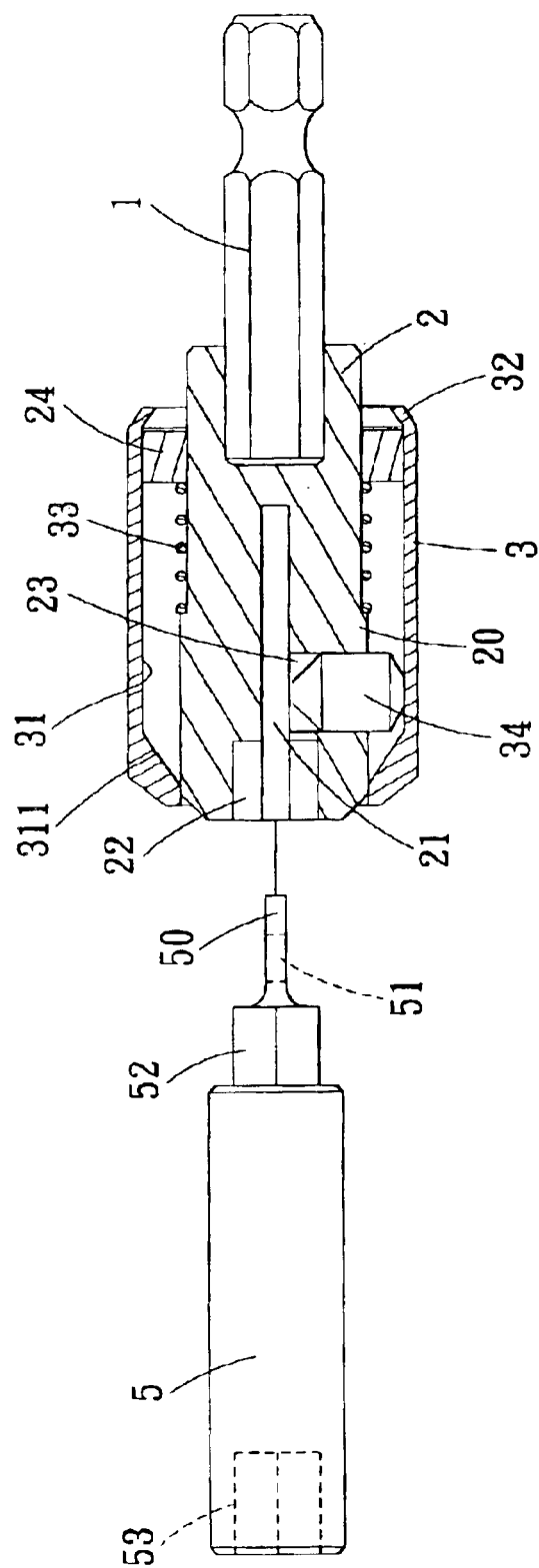
FIG. 6 shows another connection member is connected to the first end of the chuck device of the present invention.

As shown in FIGS. 5 and 6, the first end of the body 2 can also be connected with a connection member 5 which has a hexagonal section 52 at a first end thereof and a tongue 50 extends from the hexagonal section 52. An aperture 51 is defined through the tongue 50 and the tongue 50 is inserted in the slot 21 and the hexagonal section 52 is engaged with the hexagonal recess 22 in the first end of the body 2. The aperture 51 is engaged with the positioning pin 34 by the same way as disclosed in FIGS. 3 and 4 by sliding the sleeve 3. The connection member 5 has a hexagonal recess 53 defined in a second end thereof so as to receive a screw bit 54 therein. A magnet 55 is located in the screw bit 54 and can be accessed via the recess 53 so that the screw bit 54 can be well positioned.

Figure 7:
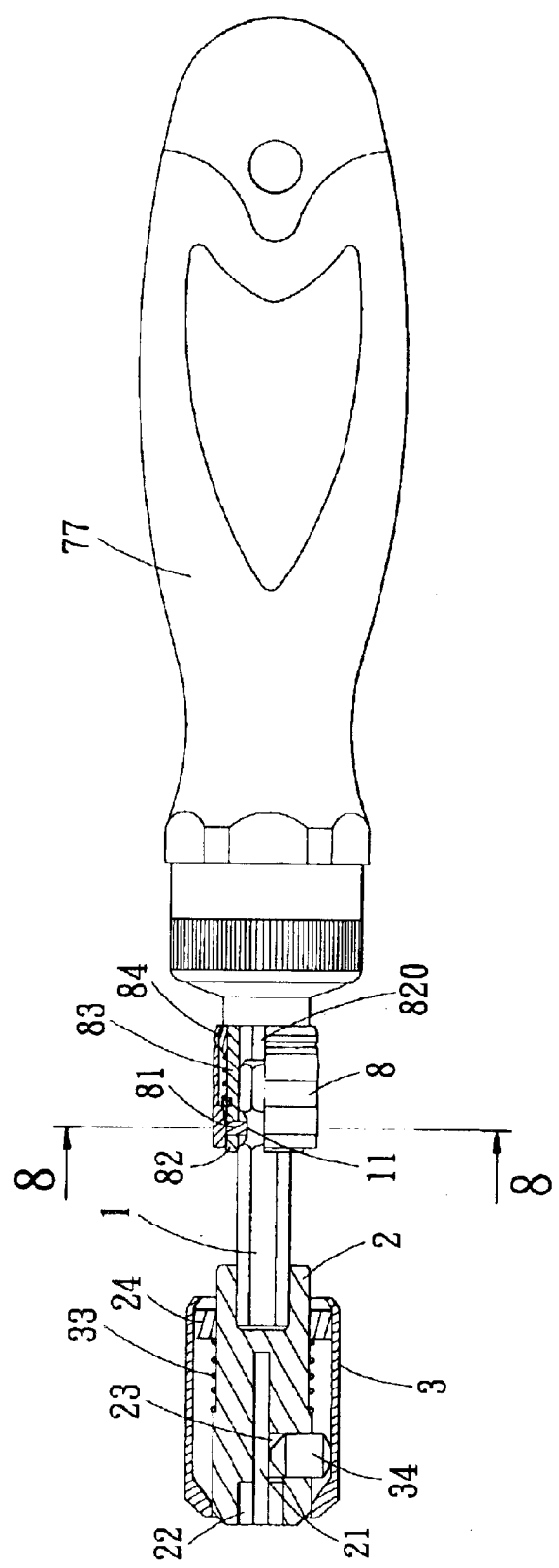
FIG. 7 shows the connection rod of the chuck device of the present invention is connected to a handle.
Figure 8:
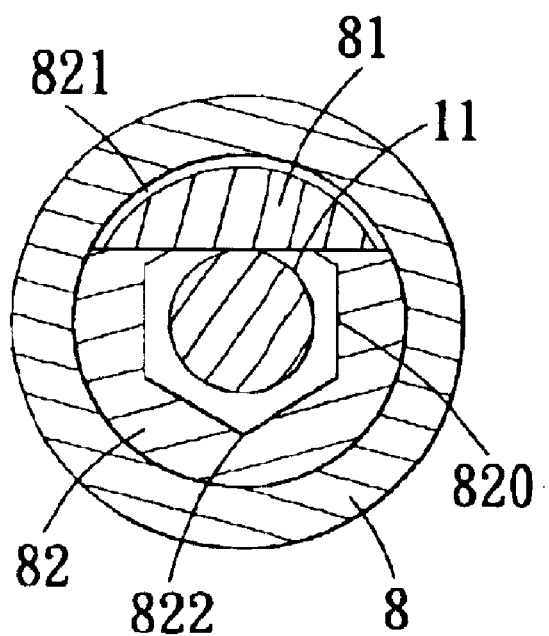
FIG. 8 is a cross sectional view to show the engagement of the connection of the chuck device of the present invention and the handle.
Figure 9:
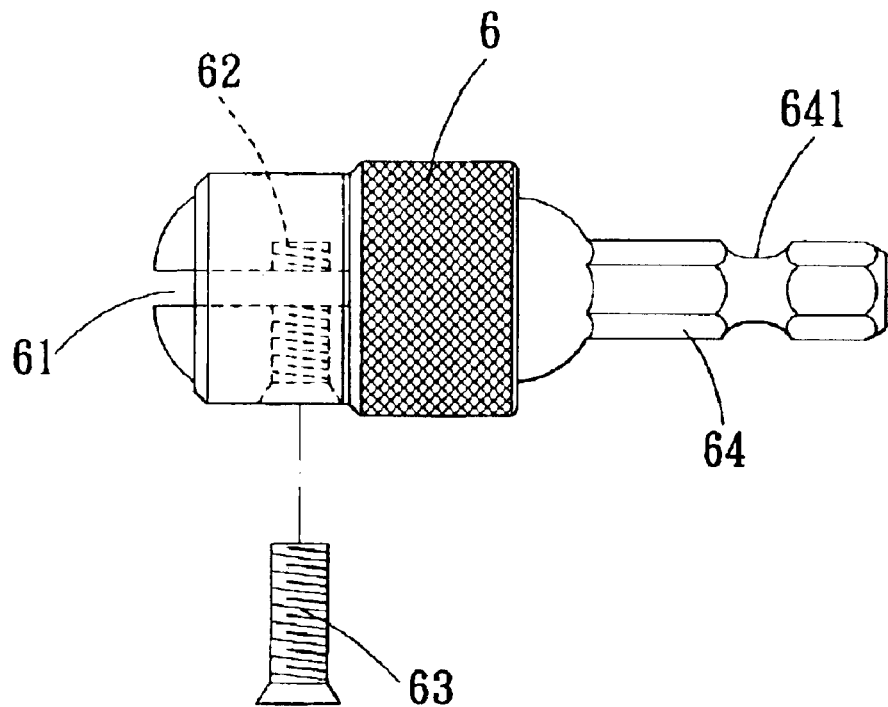
FIG. 9 shows a conventional saw blade chuck device.

Referring to FIGS. 7 and 8, the chuck device can also be connected with a handle 77 that has a connection device 8 on an end thereof to which the connection rod 1 is connected. The connection device 8 has a hexagonal recess 820 defined longitudinally in a body 82 thereof so as to receive the connection rod 1 of the chuck device. A sleeve 84 is movably mounted to the body 82 of the connection device 8 and has two shrunk inner peripheries defined in two ends of the sleeve 84. A spring 83 is mounted to the body 82 of the connection device 8 and biased between one of the two shrunk inner peripheries of the sleeve 84 and a shoulder extending from an outer periphery of the body 82 of the connection device 8. A curved hole 821 is defined radially through a wall of the body 82 of the connection device 8 and a positioning plate 81 is movably inserted in the curved hole 821. The positioning plate 81 includes a straight end which is located at a position in opposite to one of the six corners 822 of the hexagonal recess 820. The straight end of the positioning plate 81 is engaged with the groove 11 of the connection rod 1 and the other end of the positioning pin 11 is pressed by the other one of the two shrunk inner peripheries defined in the two ends of the sleeve 84.

While we have shown and described the embodiment in accordance with the present invention, it should be clear to those skilled in the art that further embodiments may be made without departing from the scope of the present invention.

What is claimed is:

1. A combination of a tool and a chuck device, the chuck device comprising:

a body having a slot defined from a first end of the body and being ended before a second end of the body, a hexagonal recess defined in the first end of the body and communicating with the slot, a hole defined radially in the body and communicating with the slot, a stepped shoulder extending from an outer periphery of the body, a spring mounted to the body and a first end of the spring stopped by the stepped shoulder, a movable clamp connected to the body and a second end of the spring contacting the movable clamp, a connection rod connected to a second end of the body;

a sleeve slidably mounted to the body and having a first tapered inner periphery at a first end of the sleeve, a second tapered inner periphery defined in a second end of the sleeve so as to push the movable clamp when sliding the sleeve by compressing the spring, and a positioning pin movably inserted in the hole and an end of the positioning pin extending from the hole and having a tapered periphery which is matched with the first tapered inner periphery at the first end of the sleeve.

2. The device as claimed in claim 1 further comprising a saw blade which has an end inserted into the slot and an aperture defined through the end of the blade, the positioning pin inserted in the aperture.

3. The device as claimed in claim 1 further comprising a connection member which has a hexagonal section at a first end thereof and a tongue extending from the hexagonal section, an aperture defined through the tongue, the tongue inserted in the slot and the aperture being engaged with the positioning pin, the hexagonal section engaged with the hexagonal recess in the first end of the body.

4. The device as claimed in claim 1 further comprising a handle that has a connection device on an end thereof, the connection device having a hexagonal recess defined longitudinally in a body thereof so as to receive the connection rod of the chuck device, a sleeve movably mounted to the body of the connection device and having two shrunk inner peripheries defined in two ends of the sleeve, a spring mounted to the body of the connection device and biased between one of the two shrunk inner peripheries of the sleeve and a shoulder extending from an outer periphery of the body of the connection device, a curved hole defined radially through a wall of the body of the connection device and a positioning plate movably inserted in the curved hole, an end of the positioning plate engaged with the groove of the connection rod and the other end of the positioning pin being pressed by the other one of the two shrunk inner peripheries defined in the two ends of the sleeve.

* * * * *